US005563753A

United States Patent [19]
Mowry et al.

[11] Patent Number: 5,563,753
[45] Date of Patent: Oct. 8, 1996

[54] CONTACT SCHEME FOR MINIMIZING INDUCTIVE PICKUP IN MAGNETORESISTIVE READ HEADS

[75] Inventors: Gregory S. Mowry, Burnsville; Charles H. Tolman, Bloomington, both of Minn.

[73] Assignee: Seagate Technology, Inc., Scotts Valley, Calif.

[21] Appl. No.: 480,533

[22] Filed: Jun. 7, 1995

Related U.S. Application Data

[63] Continuation of Ser. No. 190,659, Feb. 2, 1994, abandoned, which is a continuation-in-part of Ser. No. 141,131, Oct. 21, 1993, abandoned.

[51] Int. Cl.$^6$ .................................................. G11B 5/39
[52] U.S. Cl. ........................................................... 360/113
[58] Field of Search ................................ 360/113; 338/32 R; 324/252

[56] References Cited

U.S. PATENT DOCUMENTS

| | | | |
|---|---|---|---|
| 4,713,708 | 12/1987 | Krounbi et al. | 360/113 |
| 4,782,414 | 11/1988 | Krounbi et al. | 360/113 |
| 4,782,415 | 11/1988 | Vinal | 360/113 |
| 4,803,580 | 2/1989 | Mowry | 360/113 |
| 4,891,725 | 1/1990 | Mowry | 360/113 |
| 4,940,511 | 7/1990 | Fontana, Jr. et al. | 156/656 |
| 5,159,511 | 10/1992 | Das | 360/113 |
| 5,164,869 | 11/1992 | Fontana, Jr. et al. | 360/113 |
| 5,181,149 | 1/1993 | Katsumata et al. | 360/119 |
| 5,206,774 | 4/1993 | Blakeslee et al. | 360/113 |
| 5,251,088 | 10/1993 | Coutellier et al. | 360/113 |
| 5,256,249 | 10/1993 | Hsie et al. | 156/656 |
| 5,270,893 | 12/1993 | Sasaki et al. | 360/113 |

FOREIGN PATENT DOCUMENTS

| | | |
|---|---|---|
| 60-109010 | 6/1985 | Japan . |
| 63-025819 | 2/1988 | Japan . |
| 63-25820 | 3/1988 | Japan . |
| 03290812 | 12/1991 | Japan . |
| 05128447 | 5/1993 | Japan . |

OTHER PUBLICATIONS

*Electronics Engineer's Reference Book*, 5th Edition, 1983, pp. 50/16–50/17.

Linear Technology Corporation, *Linear Applications Handbook: A Guide to Linear Circuit Design*, 1990, pp. RR2–3 through RR2–5.

Headquarters Staff of the American Radio Relay League, *The Radio Amateur's Handbook*, 58th Edition, 1981, pp. 3–9 through 3–10.

*Primary Examiner*—Robert S. Tupper
*Attorney, Agent, or Firm*—Kinney & Lange, P.A.

[57] ABSTRACT

A disc drive recording head which senses magnetic flux from a storage medium includes an MR sensor positioned on a trailing surface of a disc drive slider. First and second electrical contacts connect the MR sensor to first and second pads positioned on the trailing surface of the MR slider and minimizes an inductive voltage induced from the storage medium during the sensing of the magnetic flux.

12 Claims, 6 Drawing Sheets

CONTACT SCHEME FOR MINIMIZING INDUCTIVE PICKUP IN MAGNETORESISTIVE READ HEADS

REFERENCE TO CO-PENDING APPLICATION

This is a file wrapper continuation of application Ser. No. 08/190,659, filed Feb. 2, 1994 now abandoned, which is a continuation-in-part application of U.S. patent application Ser. No. 08/141,131 filed Oct. 21, 1993, now abandoned entitled MAGNETORESISTIVE CONTACT SCHEMEM FOR MINIMIZING INDUCTIVE PICKUP, by Gregory S. Mowry.

BACKGROUND OF INVENTION

The present invention relates to a magnetoresistive disc drive head for high frequency and high data rate applications, and in particular to a magnetoresistive disc drive head having the capability of separating direct magnetic field effects and an inductive time rate of change effect resulting from a magnetic field and canceling the undesired inductive time rate of change effect.

Magnetoresistive (MR) sensors arc used in magnetic storage systems to detect magnetically encoded information. A time dependent magnetic field from a magnetic storage medium or disc directly modulates the resistivity of the MR sensor. The change in resistance of the MR sensor can be detected by passing a sense current through the MR sensor and measuring the voltage across the MR sensor. The resulting signal can be used to recover information from a magnetic storage medium or disc.

Practical MR sensors are typically formed using ferromagnetic metal alloys because of their high magnetic permeabilty. A ferromagnetic metal alloy is deposited in a thin film upon an electrically insulated substrate or wafer. Changing magnetic fields originating from the magnetic storage medium produce a change in the magnetization direction of the MR sensor and thereby change the resistance of the sensor. This phenomenon is called an MR effect.

MR sensors have a maximum signal-to-noise ratio when the active region of the sensor has no movable magnetic domain boundaries or no domain boundaries. In other words, the active sense area of the MR sensor should be a single domain. The presence of domain boundaries in the sensor active area that move when a field is applied gives rise to Barkhausen noise, a phenomenon caused by the irreversible motion of a magnetic domain in the presence of an applied magnetic field. Barkhausen noise cannot occur if no domain boundaries exist. Typically, a single magnetic domain MR sensor is achieved by either utilizing geometry, or via boundary control stabilization or inherent longitudinal magnetic fields or any combination thereof.

During a read operation, an MR sensor transduces the data field of a medium directly by virtue of an MR effect and produces an MR voltage signal. However, the MR sensor also couples an ideally 90° out of phase voltage signal due to the inductive pickup from the contact loop configuration of the sensor current path providing current to the MR sensor (neglecting capacitance). The out of phase signal is undesired because it adds a coherent signal that is phase shifted away from the real MR signal attempting to be detected through use of the MR effect. Therefore, the MR sensor is detecting two different signals from a single medium. First, the MR sensor detects the MR signal representing the magnetic field directly. Second, the extended MR sensor contact structure detects the inductive pick-up signal from the time rate of change of magnetic flux of the medium linking by the single-loop contact configuration of the current path. The purpose of the MR sensor is to detect the MR signal representative of the magnetic field of the medium directly, and not the inductive pick-up signal from the time rate of change of the magnetic flux.

Inductive voltage signal detection is not normally associated with MR sensor operations due to the fact that most applications utilizing MR sensors have a relatively low disc velocity. The single-loop contact configuration of a conventional MR sensor current path (wherein the single loop is encompassed by the MR sensor, bond pads, and the electrical contacts connection the MR sensor to the bond pads) will not produce significant inductive time rate of change signals from a disc since its inductive output is directly proportional to disc velocity, which itself is relatively small.

In MR sensor operations having a relatively small head disc velocity, the inductive pickup signal induced by the single-loop contact configuration of a conventional MR sensor current path is often more than 40 db down in magnitude from the MR signal itself. As a result, induced noise does not substantially affect the MR signal due to its relatively small magnitude as compared to the MR signal. However, as a relative head disc velocity increases, the inductive pick-up signal transduced by the single-loop contact configuration of the MR sensor current path can be only 10–20 db in magnitude below the MR signal. This induced signal can represent a serious signal-to-noise ratio problem.

In high performance disc drive applications having large relative head disc velocity, the single loop contact configuration of a conventional MR sensor can transduce an inductive pick-up signal which is 90° out of phase with a desired MR signal and with a magnitude that causes error by peak shifting the information away from the desired timing windows of the information channel. The inductive pick-up signal results in head disc channel performance errors.

Thus, there is a need for a disc drive head for reading an MR voltage signal representing the magnetic flux from a magnetic storage medium directly while minimizing any induced inductive pick-up signal representing time rate of change of magnetic flux from the medium.

SUMMARY OF THE INVENTION

The present invention concerns a disc drive head which directly senses magnetic flux from a magnetic storage medium through use of a magnetoresistive (MR) effect and produces a voltage signal (an MR signal) representing data from the storage medium. An electrical contact path connects an MR sensor to external circuitry during the sensing of magnetic flux from a storage medium. The electrical contact path includes a first electrical contact connecting the MR sensor to the first pad and a second electrical contact electrically connecting the MR sensor to the second pad. The first electrical contact overlaps the second electrical contact for a substantial distance between the MR sensor and the first and second pads. A single loop is formed directly above the MR sensor having a small cross-sectional area, thereby minimizing inductive signals induced in the single loop during the reading of data from a storage medium. Preferably, the first electrical contact is positioned on a first metalization layer, while the second electrical contact has a first portion positioned on the first metalization layer and a second portion positioned on a second metalization layer, wherein the first and second metalization layers are electrically isolated from each other by a insulating layer.

DETAILED DESCRIPTION OF THE PREFERRED EMBODIMENTS

Figure 1:
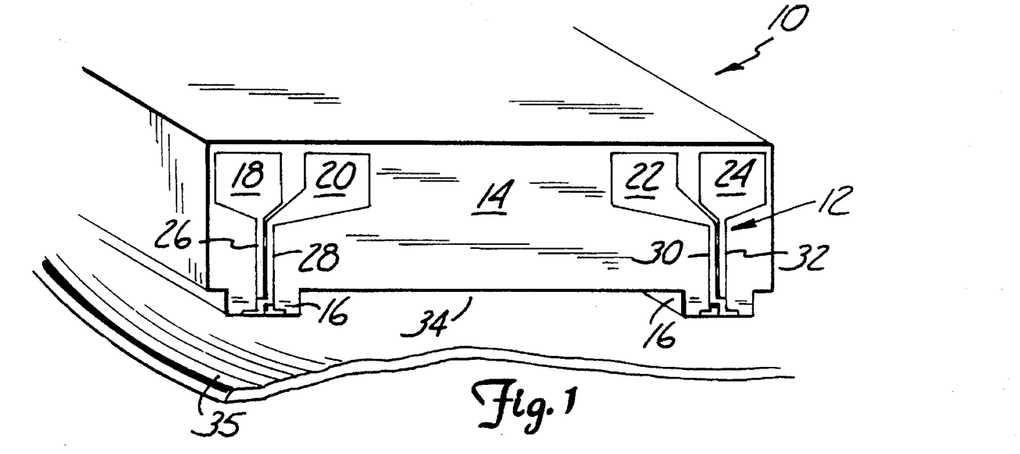
FIG. 1 is a perspective view of a disc drive slider showing the rear of the slider including a pair of the head configurations of the present invention.

FIG. 1 is a view in perspective of disc drive slider 10 showing the rear of slider 10 incorporating the present invention positioned above disc 35, which is a magnetic storage medium. Slider 10 includes head 12, rear surface 14, rails 16, pads 18, 20, 22, and 24, contacts 26, 28, 30, and 32, and recessed area 34. Rails 16 extend from rear surface 14 of slider 10 to the front surface of slider 10 (not shown in FIG. 1). Rails 16 form recessed area 34 between the rails. Pads 18, 20, 22, and 24 provide electrical connections to circuitry exterior to slider 10 not shown.

Contacts 26, 28, 30, and 32 provide electrical connection to a pair of magnetoresistive (MR) sensors (not shown in FIG. 1) at the bottom surface of rail 16 on rear surface 14. Contacts 26, 28, 30, and 32, also known as electrical leads or electrical contacts, are formed from a high conductivity metal to ensure a proper electrical connection. Contacts 26 and 28, as well as contacts 30 and 32, are routed as dose together as possible, consistent with sense current carrying capabilities and photolithography constraints. In the past, contacts 26, 28, 30, and 32 were positioned parallel to one another vertically between pads 18, 20, 22, and 24 and the bottom surface of rails 16 at rear surface 14. The electrical circuit between contacts 26 and 28 was completed by an MR sensor located between the two contacts at the bottom surface of rail 16 at rear surface 14, thereby forming a first single loop contact configuration. Likewise, the electrical circuit between contacts 30 and 32 was completed by an MR sensor located between the two contacts at the bottom surface of rail 16 at rear surface 14, thereby forming a second single loop contact configuration.

Figures 2, 5:
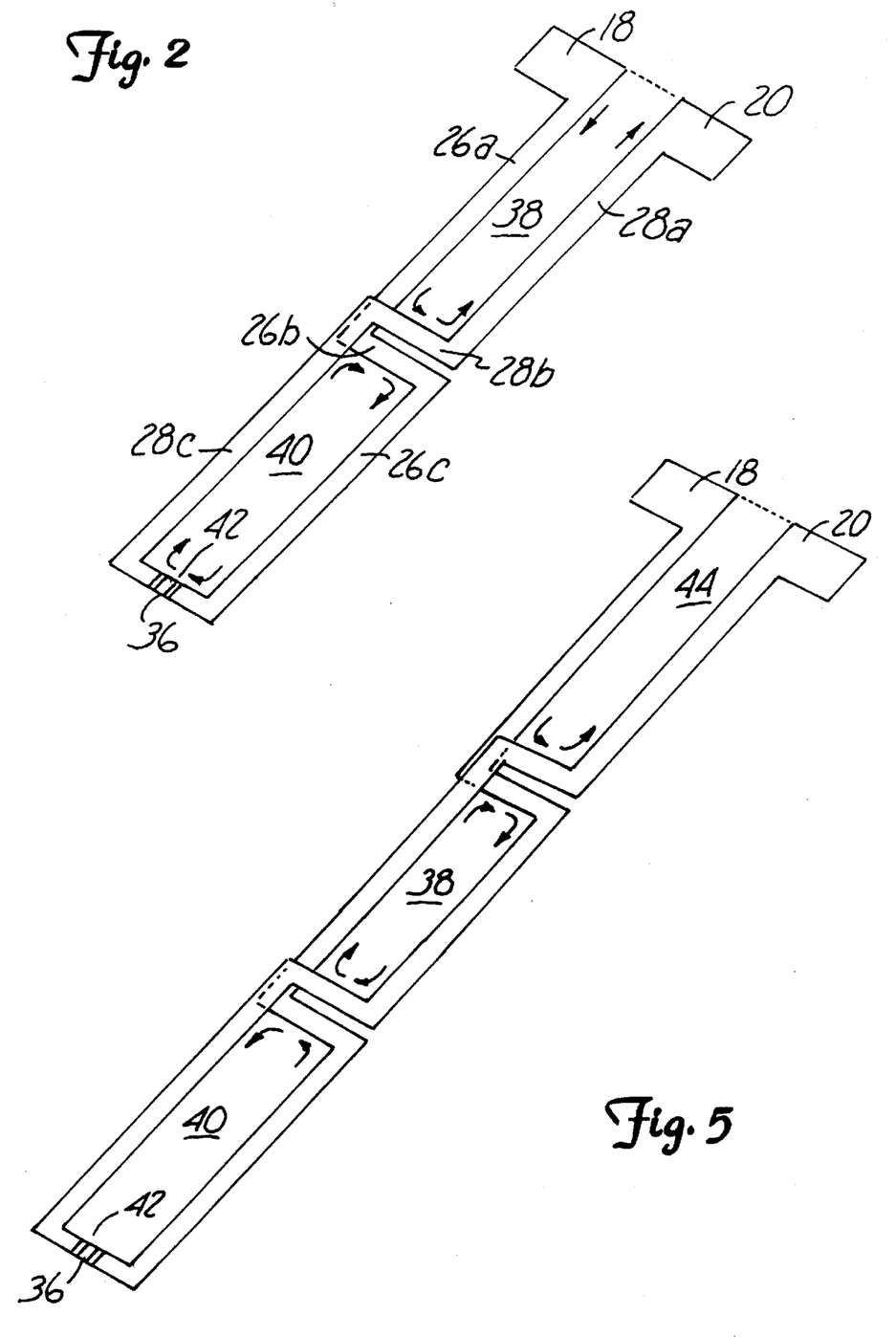
FIG. 2 is a diagrammatic view of the present invention using two loops.
FIG. 5 is a diagrammatic view of alternate embodiment of the present invention.

FIG. 2 is a greatly enlarged diagrammatic view showing the present invention. The contact routing scheme in FIG. 2 includes pads 18 and 20, contacts 26 and 28, MR sensor 36, cross-sectional areas 38 and 40, and MR sensor gap 42. Since the circuitry on the right half of slider 10, as shown in FIG. 1, is identical to the circuitry on the left half of slider 10, only the circuitry on the left half of slider 10 is shown in FIG. 2 for purposes of clarity. As shown in FIG. 2, contact 26 includes contact portions 26a, 26b, and 26c and contact 28 includes contact portions 28a, 28b, and 28c. When connected to pads 18 and 20, contacts 26 and 28 form a three-dimensional figure-eight configuration. All cross over portions of contacts 26 and 28 are electrically isolated from each other by an insulating layer to prevent the possibility of shorting.

During a high-performance read application, magnetic flux radiates from disc 35 (shown in FIG. 1) located directly beneath MR sensor 36 in a generally perpendicular direction from disc 35. Thus, most of the magnetic flux coming from the disc radiates generally perpendicular to disc 35 through MR sensor 36 between contacts 26 and 28.

MR sensor 36 is a ferromagnetic material used in a magnetic storage system to detect magnetically encoded information from disc 35 passing directly beneath MR sensor 36. A change in the magnetic field radiating from disc 35 modulates the resistivity of MR sensor 36. The changing resistance is detected by passing a sense current from pad 18 to contact 26, MR sensor 36, and returning to pad 20 via contact 28. The resulting voltage measured across MR sensor 36 can be used to recover information or data from disc 35.

In the present configuration, disc drive head 12 is detecting two distinct signals from disc 35. First, MR sensor 36 is detecting an MR signal representing the magnetic flux directly by virtue of an MR effect. An MR effect is the ability to fundamentally vary the resistivity of a ferromagnetic material as a function of an applied field, such as magnetic flux, to the magnetic material. Second, disc drive head 12 of FIG. 1 is detecting an inductive pickup signal by virtue of the time rate of change of magnetic flux from disc 35 linking areas 38 and 40 bound by contacts 26 and 28 of FIG. 2. An inductive effect is the ability to measure voltage as a function of the change in an applied field, such as magnetic flux, times a given area divided by a change in time (i.e. a time rate change of the applied field). The magnitude of the inductive pick-up signal is directly proportional to the time rate of change of magnetic flux radiating through a specific cross-sectional area encompassed by the contacts connecting pads 18 and 20 to MR sensor 36, while the polarity of the inductive pick-up signal is referenced by the direction of the induced current within contacts 26 and 28 surrounding the specific cross-sectional area.

Contacts 26 and 28 and MR sensor 36, when connected to pads 18 and 20, provide a current contact path in a form of a figure-eight configuration. Bias current, provided by an external current source, begins in pad 18 and travels down contact portion 26a, 26b, and 26c, through MR sensor 36, and returns via contact portion 28c, 28b, and 28a until it returns to pad 20. The current path in FIG. 2, represented by arrows, can signify either the bias current or an inductive current induced from disc 35. As can be seen in FIG. 2, the figure-eight loop configuration outlines a first loop which encompasses cross-sectional area 38 and a second loop which encompasses cross-sectional area 40.

Since the induced current surrounding cross-sectional area 38 is opposite in polarity as compared to the induced current surrounding cross-sectional area 40, the inductive pick-up voltage signal can be substantially canceled if the magnetic flux radiating through cross-sectional area 38 times the area of cross-section area 38 during a specific time interval is equal in magnitude as the magnetic flux radiating through cross-sectional area 40 times the area of cross-sectional area 40 during the same time interval.

During a high-performance read application, disc 35 (shown in FIG. 1) will be positioned directly under MR sensor 36. Magnetic flux will radiate upward from the magnetic storage medium and produce a desired MR signal. The magnetic flux will also produce an inductive pickup signal. However, since the current path in contacts 26 and 28 form a figure-eight configuration, this inductive signal will be substantially canceled. The inductive pickup signal in cross-sectional area 38 will be substantially equal in magnitude and opposite in polarity as the inductive pickup signal in cross-sectional area 40. With the inductive pickup signal canceled, the head configuration of the present invention will be able to read the MR signal radiating from the magnetic storage medium by modulating the resistivity of MR sensor 36 without interference from inductive noise.

Figure 3:
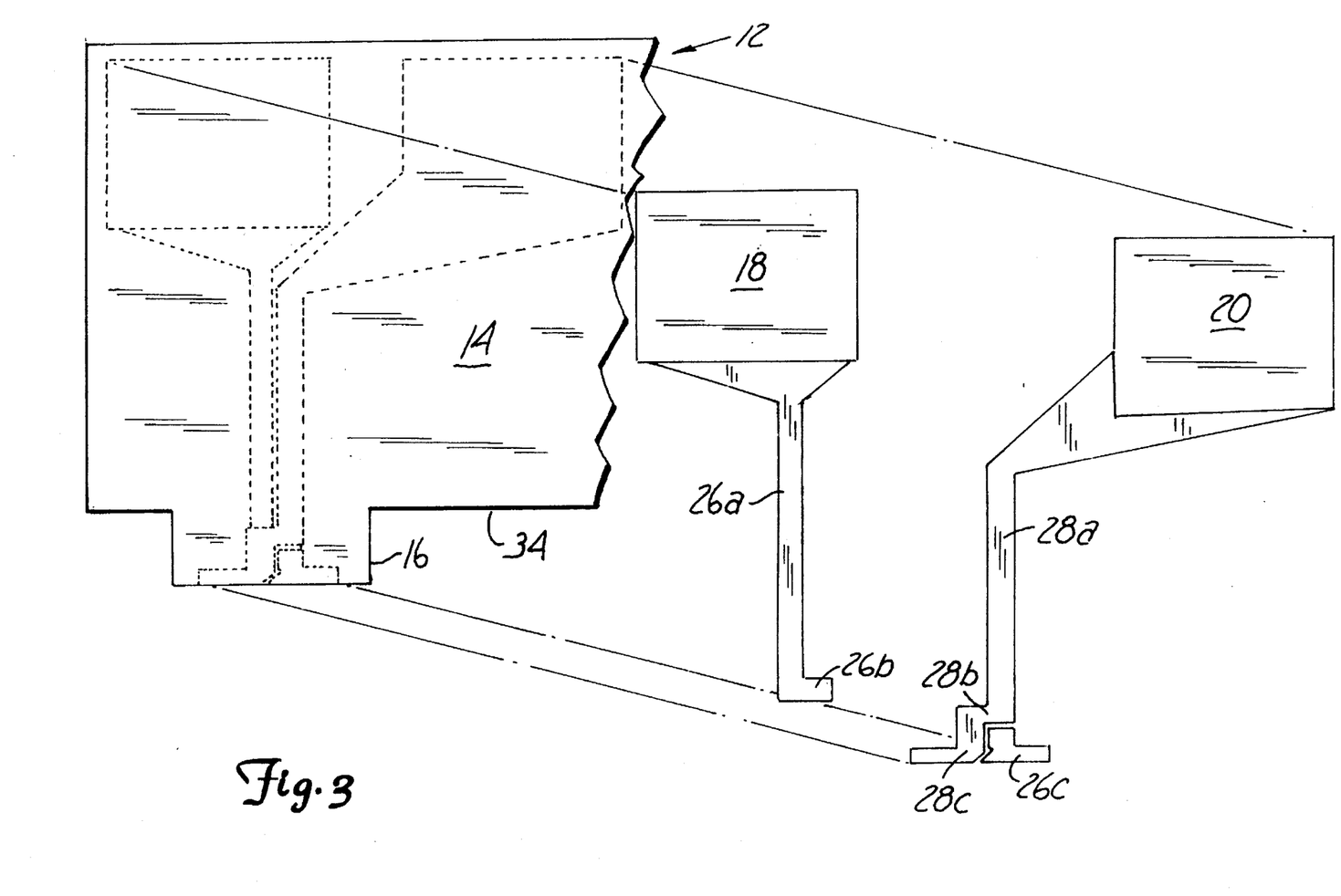
FIG. 3 is an exploded perspective view of the head elements of the present invention.

FIG. 3 is an exploded perspective view of disc drive head 12 which includes rear surface 14, rail 16, pads 18 and 20, contacts 26 and 28, and recess area 34.

FIG. 3 illustrates the different metalization layers forming contacts 26 and 28. Metalization layers are placed one on top of another, separated by insulators, to fabricate head 12. As shown in FIG. 3, contact portions 28a, 28b, and 28c of contact 28 and contact portion 26c of contact 26 are positioned on a first etch metalization layer and contact portions 26a and 26b are positioned on a second etch metalization layer. The plurality of etch metalization layers is necessary to form the crossover figure-eight configuration of electrical contacts 26 and 28 without shorting out the loops. The relative sizes of the two loops of the figure-eight configuration can be scaled to compensate for decreasing flux distal from disc 35 (shown in FIG. 1).

Figure 4:
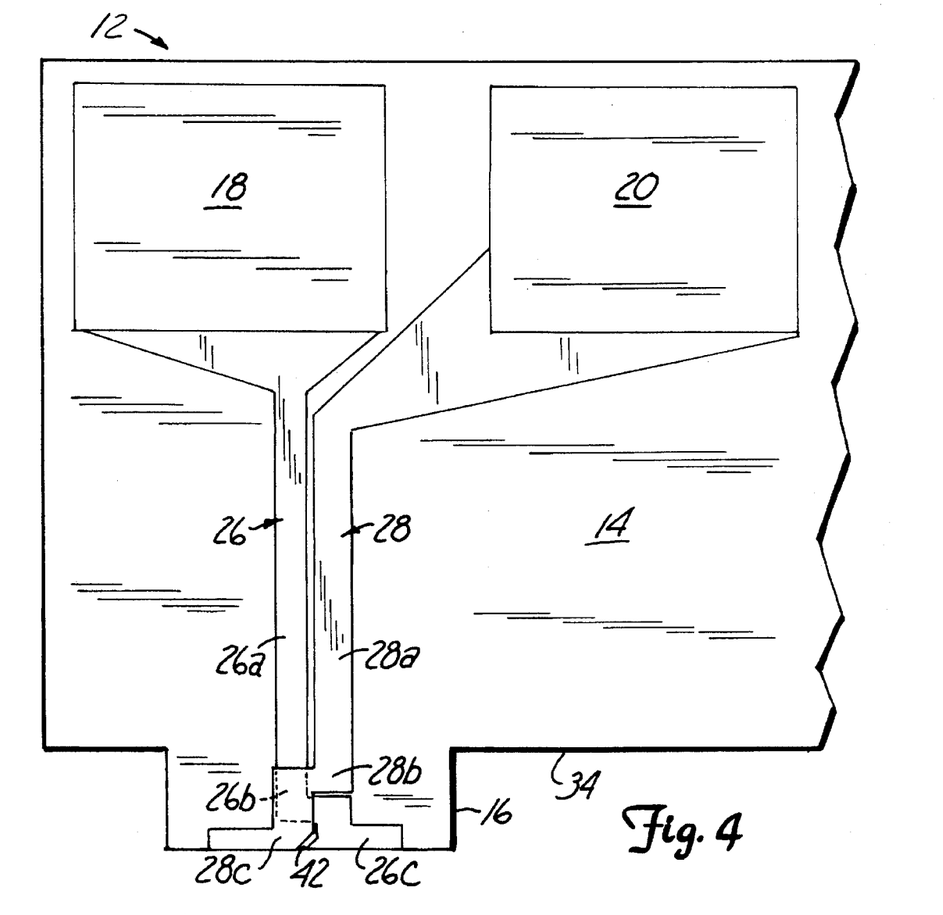
FIG. 4 is a greatly enlarged elevational view of the head portion of FIG. 1.

FIG. 4 is a greatly enlarged elevational view of the left head portion shown in FIG. 1. Head 12 includes rear surface 14, rail 16, pads 18 and 20, contacts 26 and 28 having contact portions 26a, 26b, 26c, 28a, 28b, and 28c respectively, and MR sensor gap 42. MR sensor 36, which is normally positioned within MR sensor gap 42, has been removed from this drawing for purposes of clarity.

During a high-performance read application wherein disc 35 (shown in FIG. 1) is located directly beneath rail 16 and having a large relative head disc velocity, MR sensor 36 located within gap 42 will have a changing resistivity due to the magnetic flux radiating from disc 35. Inductive pickup signals will also be detected by MR head 12. However, these undesired inductive pickup signals will be canceled due to the figure-eight configuration of contacts 26 and 28. The figure-eight contact configuration will produce an inductive pickup signal in cross-sectional area 40 (shown in FIG. 2) which is equal in magnitude and opposite in polarity as to an inductive pickup signal induced in cross-sectional area 38 (shown in FIG. 2) during a specific time interval. Therefore, any inductive pickup signal formed due to the magnetic field radiating from disc 35 will be substantially canceled. Thus, MR sensor 36 can get an accurate read of the data from disc 35 without substantial peak shifting due to inductive pickup signals.

FIG. 5 is a diagrammatic view of an alternate embodiment of the present invention. The diagrammatic view shown in FIG. 5 is similar to the diagrammatic view shown in FIG. 2. However, the diagrammatic view in FIG. 5 includes three cross-sectional areas formed by contacts 26 and 28, rather than only two cross-sectional areas. These three cross-sectional areas are fabricated by having contacts 26 and 28 formed with two cross-overs, rather than only one. FIG. 5 illustrates that a plurality of cross-sectional areas similar to cross-sectional areas 38, 40, and 44 can be utilized for inductive pickup signal cancellation, rather than the use of only two areas. The inductive pickup signal will be canceled if the magnetic field times the cross-sectional area in all areas surrounded by a contact path having a clockwise induced current path is equal to the magnetic flux times the cross-sectional area in all areas surrounded by a contact path having a counterclockwise induced current direction. Thus, the inductive pick-up signal induced in the areas surrounded by a clockwise induced current path will be equal in magnitude and opposite in polarity as the inductive pickup signal induced in the areas surrounded by a counterclockwise induced current path. Therefore, any contact routing scheme having a minimum of two areas surrounded by the contact path can be utilized to minimize the inductive pickup signal.

Figure 6:
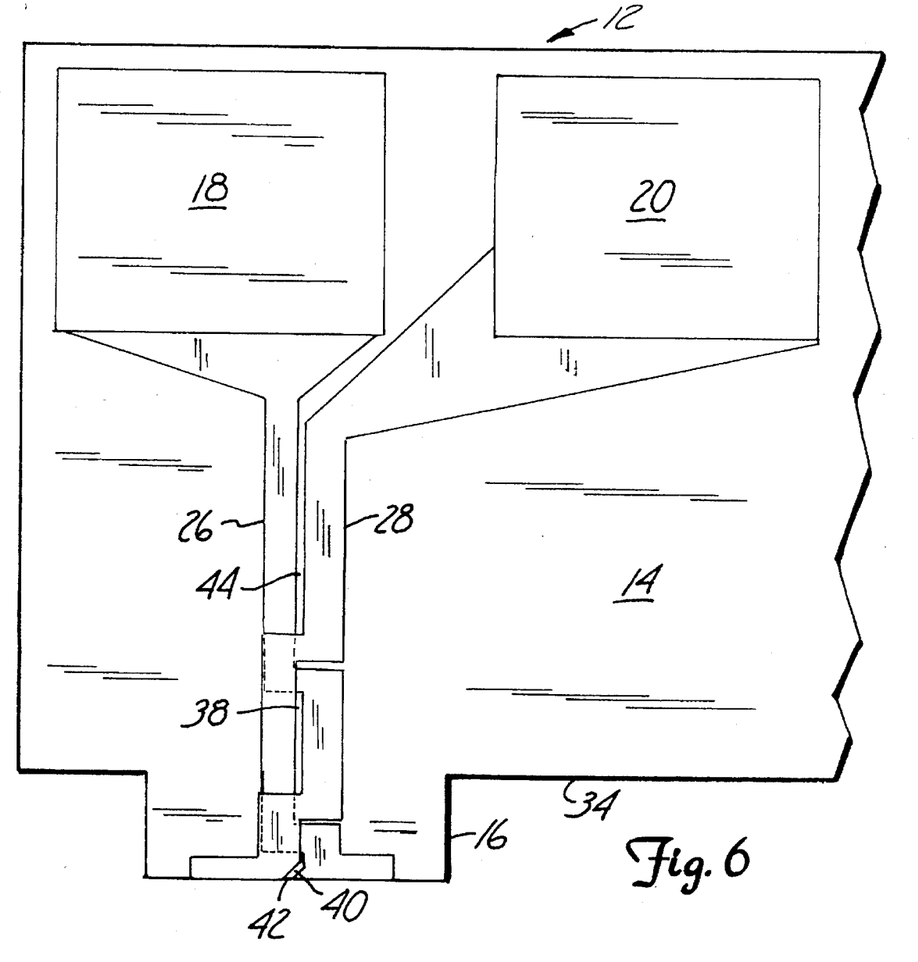
FIG. 6 is a greatly enlarged elevational view of the head portion of the alternate embodiment shown in FIG. 5.

FIG. 6 is a greatly enlarged elevational view of the head portion of the alternate embodiment shown in FIG. 5. Disk drive head 12 includes rear surface 14, rail 16, pads 18 and 20, contacts 26 and 28, recessed area 34, and gap 42. During a high-performance read application, disc 35 will be positioned immediately below head 12. MR sensor 36 located within gap 42 will directly read the magnetic field from the magnetic storage medium through use of the changing resistivity of MR sensor 36. The inductive signal induced during the read operation will be substantially canceled due to the contact routing scheme of contacts 26 and 28. Therefore, MR sensor 36 will not transduce an inductive signal which is out of phase with the desired MR signal causing errors by peak shifting away from the desired information channel.

Figures 7, 8:
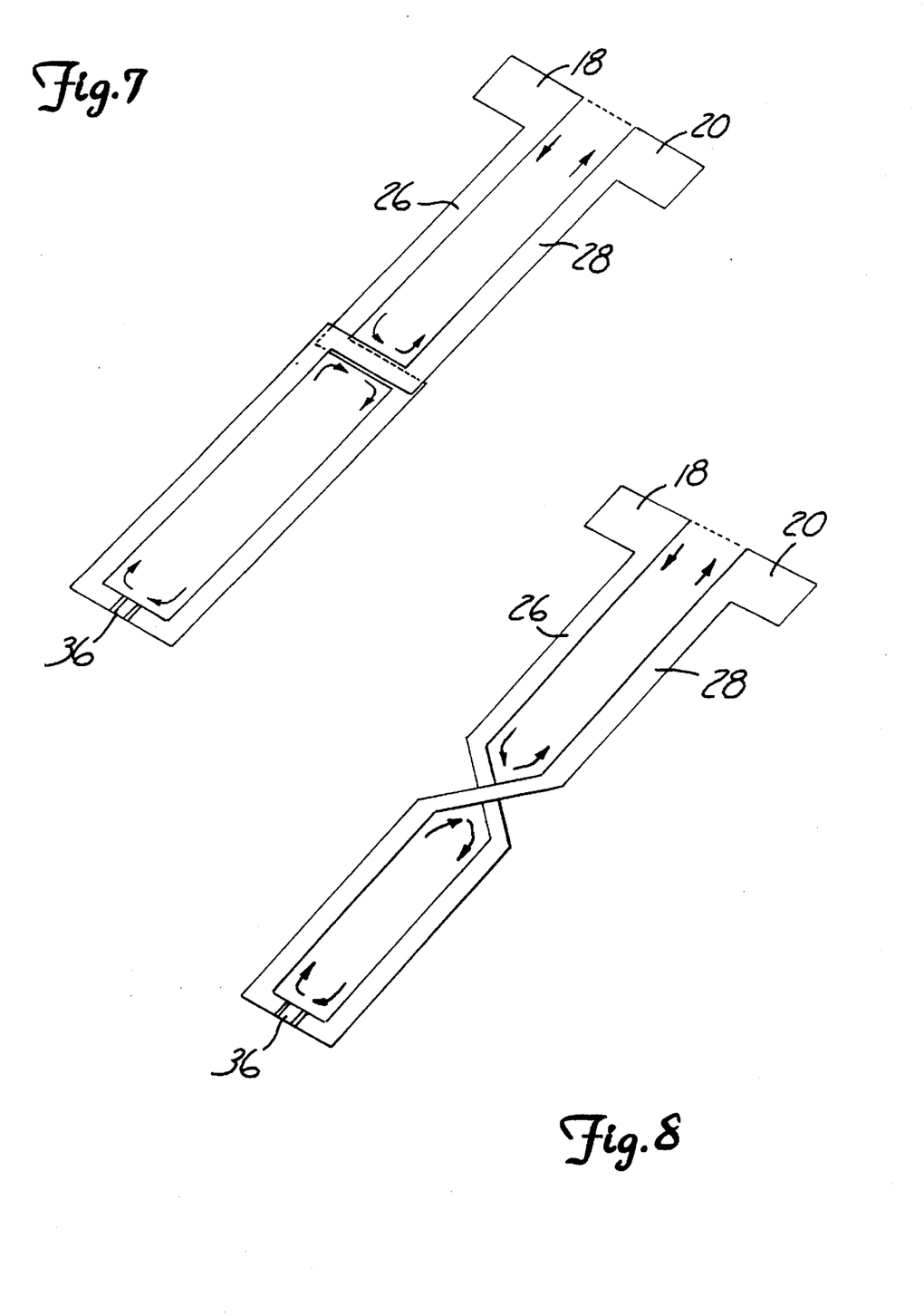
FIG. 7 is a diagrammatic view of a second alternate embodiment of the present invention.
FIG. 8 is a diagrammatic view of a third alternate embodiment of the present invention.

FIGS. 7 and 8 are diagrammatic views of second and third alternate embodiments of the present invention. The diagrams in FIGS. 7 and 8 are similar to the diagram in FIG. 2. However, the diagrammatic view in FIG. 7 shows the crossover portion of contact 26 directly beneath the crossover portion of contact 28, while the diagrammatic view in FIG. 8 shows the crossover portion of contact 28 crossing over the crossover portion of contact 26 while contacts 26 and 28 are perpendicular to one another, forming a substantial "X" configuration.

Figures 9, 10:
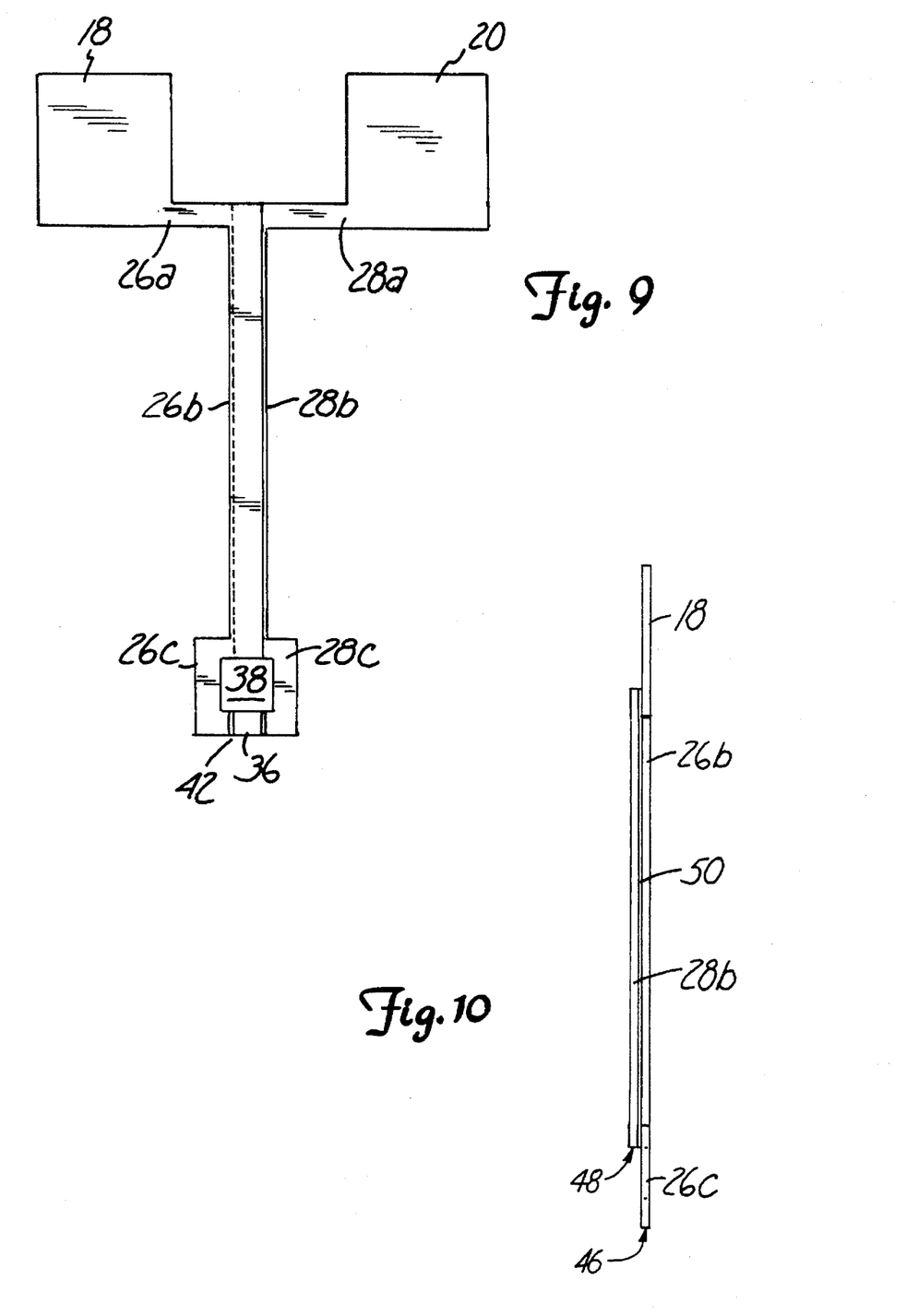
FIG. 9 is a diagrammatic view of a fourth alternate embodiment of the present invention.
FIG. 10 is a side elevational view of the fourth alternate embodiment of the present invention shown in FIG. 9.

FIGS. 9 and 10 are a diagrammatic view and a side elevational view of a fourth alternative embodiment of the present invention, respectively. Rather than having a crossover section of contacts 26 and 28 and a plurality of cross-sectional areas, the embodiment in FIG. 9 has an overlap portion separated by insulating layer 50 and only one cross-sectional area 38. For illustrative purposes, contact portions 26b and 28b are shown slightly offset from one another. However, in a preferred embodiment, contact portions 26b and 28b are directly overlapping. As shown in FIG. 9, contact portions 26b and 28b overlap for a substantial distance between pads 18 and 20 and cross-sectional area 38 and are separated by insulating layer 50. This substantial overlap of contact portions 26b and 28b dictate that cross-sectional area 38 encompassed by contact portions 26c and 28c and MR sensor 36 is relatively small. As earlier discussed, the inductive pickup signal is equal to the change in an applied field, such as magnetic flux, times a given area divided by a change in time (i.e., a time rate of change of the applied field). The magnitude of the inductive pickup signal is directly proportional to cross-sectional area 38 encompassed by contact portions 26c and 28c and MR sensor 36. Therefore, since cross-sectional area 38 is very small in this embodiment due to the overlap of contact portions 26b and 28b, the inductive pickup signal produced during the detection of an MR signal is minimized.

FIG. 10 is a side elevational view of the forth embodiment shown in FIG. 9 as seen from left to right and shows the different metalization layers which are utilized to properly form contacts 26 and 28. As shown in FIG. 10, contact portions 26a, 26b, and 26c are all located on first metalization layer 46 while contact portions 28a and 28c are located on first metalization layer 46 and contact portion 28b is located on second metalization layer 48. The two metalization layers are separated by insulating layer 50, which is necessary to prevent an electrical short between the two metalization layers. The plurality of metalization layers are necessary for contacts 26 and 28 to be properly formed. Without the plurality of metalization layers, contacts 26 and 28 could not overlap one another, nor could they cross over one another.

Although the present invention has been described with reference to preferred embodiments, workers skilled in the art will recognize that changes may be made in form and detail without departing from the spirit and scope of the invention.

What is claimed is:

1. A disc drive head for reading data from a storage medium, the disc drive head comprising:

a slider having a trailing surface;

first and second pads positioned on the trailing surface of the slider for electrical connection to external circuitry;

a magnetoresistive sensor for sensing magnetic flux from the storage medium, the magnetoresistive sensor having a first end and a second end;

a first electrical contact connecting the first pad to the first end of the magnetoresistive sensor, the first electrical contact having a first portion and a second portion, the first portion of the first electrical contact connected to the first end of the magnetoresistive sensor and the second portion of the first electrical contact connected to the first pad;

a second electrical contact connecting the second pad to the second end of the magnetoresistive sensor, the second electrical contact having a first portion and a second portion, the first portion of the second electrical contact connected to the second end of the magnetoresistive sensor and the second portion of the second electrical contact connected to the second pad; and the first and second electrical contacts being so disposed and arranged that substantially the entire length of the second portion of the first electrical contact overlaps substantially the entire length of the second portion of the second electrical contact and the first portion of the first electrical contact, the first portion of the second electrical contact and the magnetoresistive sensor define an electrically conductive loop encompassing a small cross-sectional area relative to the overlap of the second portions of the first and second electrical contacts as to minimize inductive current induced in a sensed current in the conductive loop from the storage medium in relation to the magnetic flux.

2. The disc drive head of claim 1 wherein the first and second contacts define a three-dimensional configuration residing on at least two metalization layers separated by an insulating layer.

3. The disc drive head of claim 2 wherein the first electrical contact is positioned on the slider.

4. The disc drive head of claim 3 wherein the first portion of the second electrical contact is positioned on the slider and the second portion of the second electrical contact is positioned on the insulating layer.

5. The disc drive head of claim 4 wherein the second electrical contact further comprises:

a third portion positioned on the slider; and wherein the first portion is connected to the magnetoresistive sensor, the third portion is connected to the second pad, and the second portion is connected between the first and third portions.

6. The disc drive head of claim 1 wherein the electrically conductive loop receives a base current supplied by the external circuitry onto the first and second electrical contacts.

7. An electrical contact path for electrically connecting a magnetoresistive sensor having a first end and a second end to first and second pads during the sensing of magnetic flux from a storage medium, the electrical contact path comprising:

a first electrical contact connecting the first pad to the first end of the magnetoresistive sensor, the first electrical contact having a first portion and a second portion, the first portion of the first electrical contact connected to the first end of the magnetoresistive sensor and the second portion of the first electrical contact connected to the first pad;

a second electrical contact connecting the second pad to the second end of the magnetoresistive sensor, the second electrical contact having a first portion and a second portion, the first portion of the second electrical contact connected to the second end of the magnetoresistive sensor and the second portion of the second electrical contact connected to the second pad; and the first and second electrical contacts being so disposed and arranged that substantially the entire length of the second portion of the first electrical contact overlaps substantially the entire length of the second portion of the second electrical contact and the first portion of the first electrical contact, the first portion of the second electrical contact and the magnetoresistive sensor define an electrically conductive loop encompassing a small cross-sectional area relative to the overlap of the second portions of the first and second electrical contacts as to minimize inductive current induced in a sensed current in the conductive loop from the storage medium in relation to the magnetic flux.

8. The electrical contact path of claim 7 wherein the first and second contacts define a three-dimensional configuration residing on at least two metalization layers separated by an insulating layer.

9. The electrical contact path of claim 8 wherein the first electrical contact is positioned on slider.

10. The electrical contact path of claim 9 wherein the first portion of the second electrical contact is positioned on the slider and the second portion of the second electrical contact is positioned on the insulating layer.

11. The electrical contact path of claim 10 wherein the second electrical contact further comprises:

a third portion positioned on the slider; and wherein the first portion is connected to the magnetoresistive sensor, the third portion is connected to the second pad, and the second portion is connected between the first and third portions.

12. The electrical contact path of claim 8 wherein the electrically conductive loop receives a base current supplied by the external circuitry onto the first and second electrical contacts.

* * * * *

UNITED STATES PATENT AND TRADEMARK OFFICE
CERTIFICATE OF CORRECTION

PATENT NO. : 5,563,753

DATED : OCTOBER 8, 1996

INVENTOR(S) : GREGORY S. MOWRY, CHARLES H. TOLMAN

It is certified that error appears in the above-indentified patent and that said Letters Patent is hereby corrected as shown below:

Col. 1, line 9, delete "SCHEMEM", insert --SCHEME--

Col. 3, line 46, delete "dose", insert --close--

Col. 8, line 59, after "claim", delete "8", insert --7--

Signed and Sealed this

Fourteenth Day of January, 1997

Attest:

BRUCE LEHMAN

Attesting Officer

Commissioner of Patents and Trademarks